United States Patent
Takiguchi et al.

(10) Patent No.: US 8,897,962 B2
(45) Date of Patent: Nov. 25, 2014

(54) REACTION FORCE CONTROL DEVICE

(75) Inventors: Hirotaka Takiguchi, Utsunomiya (JP); Hiroshi Sekine, Tochigi-ken (JP); Go Suzaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/978,594

(22) PCT Filed: Jan. 11, 2012

(86) PCT No.: PCT/JP2012/050340
§ 371 (c)(1),
(2), (4) Date: Jul. 8, 2013

(87) PCT Pub. No.: WO2012/098963
PCT Pub. Date: Jul. 26, 2012

(65) Prior Publication Data
US 2013/0304317 A1    Nov. 14, 2013

(30) Foreign Application Priority Data
Jan. 20, 2011    (JP) ................................. 2011-009693

(51) Int. Cl.
*B60K 26/02*    (2006.01)
*B60W 30/18*    (2012.01)
*B60W 50/16*    (2012.01)
*B60K 31/00*    (2006.01)

(52) U.S. Cl.
CPC ........ *B60K 26/021* (2013.01); *B60W 30/18145* (2013.01); *B60W 50/16* (2013.01); *B60K 31/0066* (2013.01); *B60W 2550/146* (2013.01)
USPC ........................................................... 701/36

(58) Field of Classification Search
CPC ............. B60K 26/021; B60K 31/0066; B60K 2026/023; B60W 50/16
USPC ............................................................ 701/36
See application file for complete search history.

(56) References Cited

U.S. PATENT DOCUMENTS 7,734,404 B2 *    6/2010    Shiiba et al. .................... 701/70
8,060,305 B2 *    11/2011    Kimura et al. ................ 701/301
(Continued)

FOREIGN PATENT DOCUMENTS

JP    11-229917 A    8/1999
JP    2003260951 A *    9/2003    ............. B60K 26/02
(Continued)

OTHER PUBLICATIONS

JPO machine translation of JP 2005-329896 (original JP document published Dec. 2, 2005).*

*Primary Examiner* — Behrang Badii
*Assistant Examiner* — David Testardi
(74) *Attorney, Agent, or Firm* — Carrier Blackman & Associates, P.C.; Joseph P. Carrier; Fulchand P. Shende

(57) ABSTRACT

Provided is a reaction force control device for reducing discomfort experienced by the driver operating the accelerator pedal when continuous curves are being traveled, and setting the characteristics of the reaction force on the accelerator pedal in accordance with the curves. In the case that the target reaction force, which has been set prior to entering a subsequently traveled second curve, is greater than the current reaction force acting on the acceleration pedal and being generated during the turn through the first curve, a reaction force controller controls the operation so as to reduce the target reaction force imparted on the second curve until the vehicle leaves the first curve.

9 Claims, 8 Drawing Sheets

(56) References Cited

U.S. PATENT DOCUMENTS

| | | | |
|---|---|---|---|
| 8,165,747 B2 * | 4/2012 | Ueno et al. | 701/36 |
| 8,244,460 B2 * | 8/2012 | Kubota et al. | 701/408 |
| 8,306,717 B2 * | 11/2012 | Suzaki et al. | 701/93 |
| 8,527,171 B2 * | 9/2013 | Sugano et al. | 701/70 |
| 8,532,900 B2 * | 9/2013 | Maruyama et al. | 701/70 |
| 2007/0050110 A1 * | 3/2007 | Kondoh et al. | 701/36 |
| 2013/0274996 A1 * | 10/2013 | Sekine | 701/36 |

FOREIGN PATENT DOCUMENTS

| | | | |
|---|---|---|---|
| JP | 2005-329896 A | 12/2005 | |
| JP | 2007076468 A * | 3/2007 | |
| JP | 2009221941 A * | 10/2009 | |
| WO | WO 2009136512 A1 * | 11/2009 | B60K 31/18 |

* cited by examiner

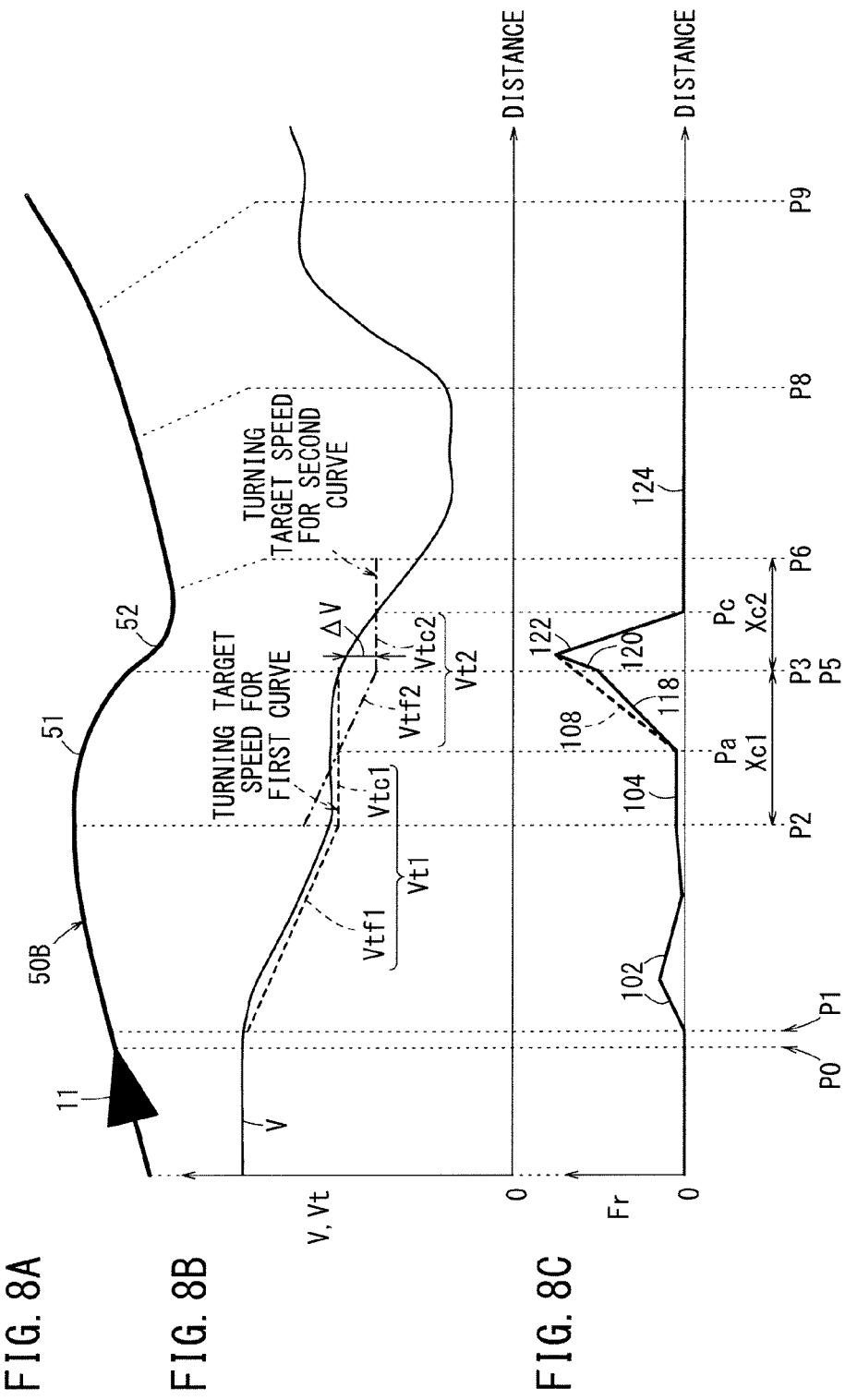

REACTION FORCE CONTROL DEVICE

TECHNICAL FIELD

The present invention relates to a reaction force control apparatus (device) for applying a reaction force to an accelerator pedal of a vehicle to prompt the driver of the vehicle to decelerate the vehicle when there is a curve ahead along the road on which the vehicle is driving.

BACKGROUND ART

Japanese Laid-Open Patent Publication No. 1999-229917 (hereinafter referred to as "JP1999-229917A") discloses a vehicle control apparatus for controlling the drive power of a vehicle depending on a curve that is ahead on the road. When a navigation device on the vehicle detects a curve, the vehicle control apparatus sets a deceleration control permission range based on the detected curve. When the vehicle enters the deceleration control permission range, the vehicle control apparatus incrementally corrects an amount of engine braking in order to perform a deceleration control process (see paragraphs [0002] and [0003] of JP1999-229917A).

According to JP1999-229917A, in order to prevent the deceleration control process from being switched on and off frequently in a situation where there is a succession of curves along a path such as a mountain path, for example, if the distance between adjacent deceleration control permission ranges is small, then the vehicle control apparatus joins the adjacent deceleration control permission ranges into a single deceleration control permission range (see paragraph [0007] of JP1999-229917A).

SUMMARY OF INVENTION

According to JP1999-229917A, however, as can be understood from the fact that the deceleration control process is performed even if the accelerator opening is zero (see paragraphs [0017], [0035], and [0040] of JP1999-229917A), no consideration is given to a so-called accelerator pedal reaction force control process, which generates a reaction force on the accelerator pedal while the driver presses the accelerator pedal, to thereby allow the driver to sense the reaction force and prompt the driver to return the accelerator pedal.

When an accelerator pedal reaction force is generated in order to notify the driver concerning a succession of curves up ahead, or to make the driver reduce the accelerator opening prior to the vehicle entering each of the curves, it may be advisable to perform a control process for generating a reaction force, which is proportional to the curvature of the curve.

However, when such a control process is performed to generate a reaction force that is proportional to the curvature of each of the curves prior to the vehicle entering the curves, the driver may feel strange and uncomfortable concerning operation of the accelerator pedal while the vehicle is making a turn along a curve, since a reaction force proportional to the curvature of a subsequent curve is generated while driving within the present curve.

The present invention has been made in view of the above problems. It is an object of the present invention to provide a reaction force control apparatus, which minimizes the tendency to make the driver of a vehicle feel strange and uncomfortable concerning operation of the accelerator pedal while the vehicle is traveling along a curve, especially a succession of curves.

According to the present invention, there is provided a reaction force control apparatus comprising an accelerator pedal, a reaction force controller for controlling a reaction force generated by an actuator, the reaction force being applied to the accelerator pedal, and a curve detector for detecting curves along a path traveled by a host vehicle, wherein when the host vehicle travels along at least two curves including a first curve and a second curve subsequent to the first curve, the reaction force controller sets respective target reaction forces for the first curve and the second curve, and the reaction force controller corrects the target reaction force for one of the first curve and the second curve based on the target reaction force for another of the first curve and the second curve.

According to the present invention, when the host vehicle travels along a succession of curves, the driver feels less strange and uncomfortable concerning operation of the accelerator pedal, and reaction force characteristics for the accelerator pedal are established depending on the nature of the curves.

The reaction force controller may set a target reaction force for the accelerator pedal depending on a curvature of each of the curves before the host vehicle enters the curves, and when the reaction force controller generates and applies the set target reaction force to the accelerator pedal before the host vehicle enters the curves, if a target reaction force, which is set before the host vehicle enters the second curve, is greater than a present reaction force generated and applied to the accelerator pedal while the host vehicle is turning along the first curve, the reaction force controller may reduce the target reaction force for the second curve and apply a reduced reaction force to the accelerator pedal until the host vehicle has finished traveling through the first curve.

According to the present invention, when the host vehicle travels along a succession of curves, the driver feels less strange and uncomfortable concerning operation of the accelerator pedal, and reaction force characteristics for the accelerator pedal are established depending on the nature of the curves.

The reaction force controller may make an amount of a reduction in the target reaction force for the second curve smaller as the distance between an exit of the first curve and an entrance of the second curve, which are detected by the curve detector, becomes shorter.

If the distance between the first curve and the second curve is shorter, the driver is required to decelerate the host vehicle more than if the distance between the first curve and the second curve were greater. Since the reduction in the target reaction force for the second curve becomes smaller as the distance is shorter, the driver is prompted to decelerate the vehicle in preparation for the second curve, or the driver is made aware of the presence of the second curve, while feeling less strange and uncomfortable while the vehicle travels along the first curve. Consequently, the driver is able to maneuver the vehicle more easily while the host vehicle travels along a succession of curves that are spaced by short distances.

The reaction force controller may reduce the amount by which the target reaction force is reduced for the second curve if the curvature of the second curve is detected by the curve detector as being smaller than the curvature of the first curve, or if the radius of curvature of the second curve is detected by the curve detector as being greater than the radius of curvature of the first curve.

More specifically, if the curvature of the second curve is smaller, i.e., if the radius of curvature of the second curve is greater, then since the driver feels less strange and uncomfortable concerning operation of the accelerator pedal due to the generated reaction force, the driver can prepare for turning along the second curve, which has a smaller curvature, i.e., a greater radius of curvature, even if a reduction in the target reaction force for the second curve is reduced.

The reaction force controller may not reduce the target reaction force for the second curve if the curvature of the second curve is detected by the curve detector as being smaller than the curvature of the first curve, or if the radius of curvature of the second curve is detected by the curve detector as being greater than the radius of curvature of the first curve.

More specifically, if the curvature of the second curve is smaller, i.e., if the radius of curvature of the second curve is greater, then since the driver feels less strange and uncomfortable concerning operation of the accelerator pedal due to the generated reaction force, the driver can prepare for turning along the second curve, which has a smaller curvature, i.e., a greater radius of curvature, even if the target reaction force for the second curve is not reduced.

The reaction force controller may reduce an amount by which the target reaction force for the second curve is reduced if the curvature of the second curve is detected by the curve detector as being smaller than a prescribed curvature, i.e., if the radius of curvature of the second curve is detected by the curve detector as being greater than a prescribed radius of curvature.

More specifically, if the curvature of the second curve is smaller than a prescribed curvature, i.e., if the radius of curvature of the second curve is greater than a prescribed radius of curvature, then since the driver feels less strange and uncomfortable concerning operation of the accelerator pedal due to the generated reaction force, the driver can prepare for turning along the second curve, which has a smaller curvature, i.e., a greater radius of curvature, even if a reduction in the target reaction force for the second curve is reduced.

The reaction force controller may not reduce the target reaction force for the second curve if the curvature of the second curve is detected by the curve detector as being smaller than a prescribed curvature, i.e., if the radius of curvature of the second curve is detected by the curve detector as being greater than a prescribed radius of curvature.

More specifically, if the curvature of the second curve is smaller than a prescribed curvature, i.e., if the radius of curvature of the second curve is greater than a prescribed radius of curvature, then since the driver feels less strange and uncomfortable concerning operation of the accelerator pedal due to the generated reaction force, the driver can prepare for turning along the second curve, which has a smaller curvature, i.e., a greater radius of curvature, even if the target reaction force for the second curve is not reduced.

The reaction force control apparatus may further comprise a vehicle speed sensor for measuring a vehicle speed of the host vehicle, and a target speed calculator for calculating a speed at which the host vehicle travels or turns along each of the curves, as a turning target speed depending on a curvature of each of the curves that are detected, wherein the target speed calculator calculates a reduction characteristic for reducing the target speed from the present vehicle speed measured by the vehicle speed sensor to the turning target speed, and the reaction force controller sets the target reaction force based on a present vehicle speed measured by the vehicle speed sensor and the turning target speed, and the reduction characteristic for reducing the target speed, which are calculated by the target speed calculator.

According to the present invention, there is provided a reaction force control apparatus comprising an accelerator pedal, a reaction force controller for controlling a reaction force generated by an actuator, the reaction force being applied to the accelerator pedal, and a curve detector for detecting curves along a path traveled by a host vehicle, wherein if the curve detector detects only one curve, the reaction force controller sets a target reaction force depending on the detected one curve, and gradually reduces the reaction force when the host vehicle reaches an end point of the detected one curve.

According to the present invention, the driver is less likely to feel strange and uncomfortable concerning operation of the accelerator pedal when the host vehicle travels along the curve, as well as immediately after the host vehicle has traveled along the curve.

If the curve detector detects the second curve while the host vehicle is traveling or turning along the first curve, the reaction force controller may calculate a second curve target reaction force based on the second curve, and if the calculated second curve target reaction force is greater than a reaction force presently applied to the accelerator pedal while the host vehicle is traveling along the first curve, the reaction force controller may perform a rate limiting process on a reaction force characteristic, depending on a difference between a present vehicle speed measured by the vehicle speed sensor and a target speed set for the second curve. With such an arrangement, the driver feels less strange and uncomfortable concerning operation of the accelerator pedal at the time that the host vehicle travels along a succession of curves.

According to the present invention, when the host vehicle travels along a succession of curves, the driver feels less strange and uncomfortable concerning operation of the accelerator pedal, and depending on the nature of the curves, reaction force characteristics for the accelerator pedal can be established.

BRIEF DESCRIPTION OF DRAWINGS

FIG. 8A is a diagram of a path that illustrates a reaction force control process, which is performed when a first curve is followed by a second curve immediately after exiting from the first curve;

FIG. 8B is a diagram that illustrates setting of a target speed with respect to distances in the presence of the second curve, which follows immediately after exiting from the first curve; and FIG. 8C is a diagram that illustrates setting of reaction forces with respect to distances in the presence of the second curve, which follows immediately after exiting from the first curve.

DESCRIPTION OF EMBODIMENTS

An embodiment of the present invention will be described below with reference to the drawings.

Figure 1:
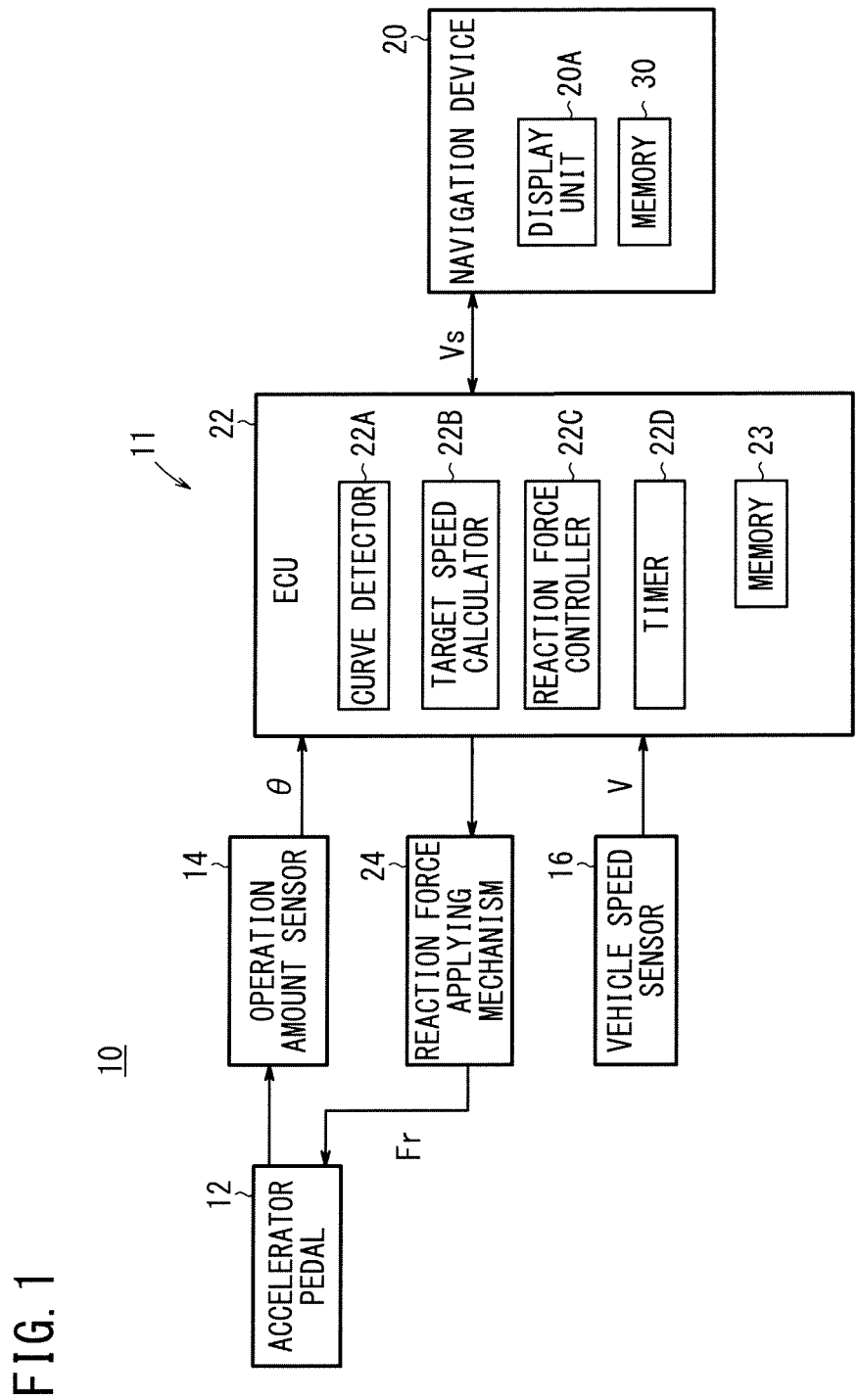
FIG. 1 is a block diagram of a reaction force control apparatus according to an embodiment of the present invention.

FIG. 1 shows in block form a reaction force control apparatus 10 according to an embodiment of the present invention. The reaction force control apparatus 10 is incorporated in a vehicle (hereinafter referred to as a "host vehicle") 11 such as a four-wheeled passenger car or the like. Basically, the reaction force control apparatus 10 includes an accelerator pedal 12 for adjusting an opening of a throttle valve, not shown, an operation amount sensor 14 (accelerator pedal operation amount sensor), a vehicle speed sensor 16 (vehicle speedometer), a navigation device 20, an ECU (Electronic Control Unit) 22, and a reaction force applying mechanism 24.

The accelerator pedal operation amount sensor 14 detects an operation amount (accelerator pedal operation amount θ [°]) from an original position (θ=0 [°]) of the accelerator pedal 12 with a potentiometer or the like, and outputs the detected accelerator pedal operation amount θ to the ECU 22.

The vehicle speed sensor 16 measures a vehicle speed (present speed) V [km/h] of the host vehicle 11 and outputs the measured vehicle speed V to the ECU 22.

The navigation device 20 detects the position of the host vehicle 11 using GPS (Global Positioning System), performs a map matching process for comparing the detected position with a present position contained in map data stored in a memory 30, and displays the present position of the host vehicle 11 on a map as a result of the map matching process, within a given range that is displayed on a display unit 20A.

The navigation device 20 also functions as a curve detecting device for detecting a curve or a plurality of curves on the road traveled by the host vehicle 11, i.e., a path along which the host vehicle 11 is guided to a preset destination. In the present embodiment, the navigation device 20, which functions as the curve detecting device, sends information to a curve detector 22A of the ECU 22 in relation to (the position of) the entrance of a curve, the distance along the curve (zone), the curvature (the reciprocal of the radius of curvature) of the curve, (the position of) the exit of the curve, (the position of) the entrance of a next curve subsequent to the aforementioned curve, the distance along the next curve (zone) and the curvature thereof, and (the position of) the exit of the next curve.

According to the present embodiment, the curve detector 22A detects (information concerning) the curves from the navigation device 20. However, the curve detector 22A may detect (information concerning) a curve, e.g., the entrance and exit of the curve, and the curve (curved section), from a handle angle (steering angle) of a handle (steering wheel), not shown, a maintained steering angle, a time during which the steering wheel is turned, a time-dependent change in a lateral G-force that is applied to the host vehicle 11, which is detected by a non-illustrated lateral G-force sensor, and a time-dependent change in a yaw rate of the host vehicle 11, which is detected by a non-illustrated yaw rate sensor.

The ECU 22 includes a target speed calculator 22B, which calculates a speed at which the host vehicle 11 travels (turns) along a detected curve depending on the curvature (the reciprocal of the radius of curvature) of the detected curve, as a turning target speed Vtc. The target speed calculator 22B also calculates a reduction characteristic for reducing a target speed Vt, in order to change the present speed (present speed or actual speed) V to the turning target speed Vtc, until the host vehicle 11 reaches the entrance of the detected curve.

The ECU 22 includes a reaction force controller 22C, which compares the present speed V and the reduction characteristic for the target speed Vt and the turning target speed Vtc with each other, and calculates a reaction force Fr to be applied to the accelerator pedal 12 based on the compared result. The reaction force controller 22C also generates a control signal representing the calculated reaction force Fr, and supplies the control signal to the reaction force applying mechanism 24, thereby instructing the reaction force applying mechanism 24 to apply the reaction force Fr.

The reaction force applying mechanism 24, which comprises a non-illustrated motor or the like (not shown) that is connected to the accelerator pedal 12, applies the reaction force Fr to the accelerator pedal 12 depending on the control signal received from the ECU 22.

The accelerator pedal 12 receives the reaction force Fr from the reaction force applying mechanism 24, in addition to an original position restoring force Forg, which is applied to the accelerator pedal 12 by a spring or the like (i.e., a force tending to restore the accelerator pedal 12 to the original position, by which the accelerator pedal 12 returns to an original position at which the accelerator pedal operation amount θ=0 [°] when the driver releases his or her foot from the accelerator pedal 12).

The ECU 22 operates as a function realizing component (function realizing means), which realizes various functions when a CPU executes programs stored in a memory (storage unit) 23 such as a ROM or the like, based on various input signals. According to the present embodiment, in addition to functioning as the curve detector 22A, the target speed calculator 22B, and the reaction force controller 22C, the ECU 22 also functions as a timer 22D for measuring time intervals. Rather than a ROM, the memory 23 may be a flash memory, an EEPROM, a RAM, a hard disk, or the like.

The reaction force control apparatus 10 according to the present embodiment basically is constructed as described above. A process of setting and controlling a reaction force that is applied to the accelerator pedal 12, which is carried out by the ECU 22, will be described in detail below with reference to the flowchart shown in FIG. 2 and the distance charts shown in FIGS. 4A, 4B, and 4C.

[First Process: Reaction Force Control Process in the Absence of a Second Curve within a Prescribed Distance after Exiting From a First Curve]

Figures 4A, 4B, 4C:
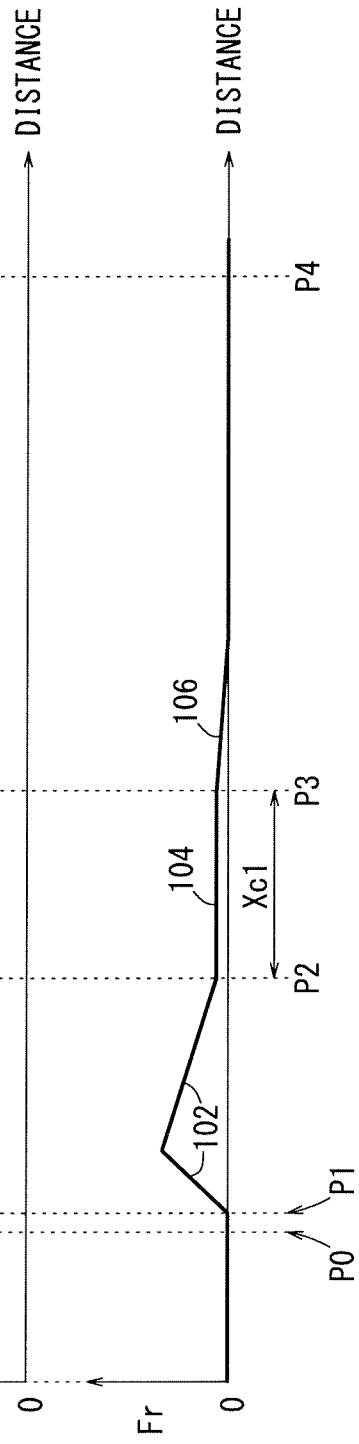
FIG. 4A is a diagram of a path that illustrates a reaction force control process, which is performed when a first curve is not followed by a second curve within a prescribed distance after exiting from the first curve.
FIG. 4B is a diagram that illustrates setting of a target speed with respect to distances in the absence of the second curve.
FIG. 4C is a diagram that illustrates setting of reaction forces with respect to distances in the absence of the second curve.

As shown in FIG. 4A, the host vehicle 11 travels along a path 50 up to a destination that is set by the navigation device 20. In FIG. 4A, the present position of the host vehicle 11 is indicated by a solid triangular mark. In step S1, while the host vehicle 11 travels along the path 50, the navigation device 20, which functions as a curve detecting device, detects whether or not there is a first curve 51 within a prescribed distance on the path 50 ahead of the host vehicle 11. If the navigation device 20 detects a first curve 51, then the navigation device 20 sends information to the curve detector 22A concerning the curve, including the distance from the host vehicle 11 to a first curve entrance point P2, the position of the first curve entrance point P2, the position of a first curve exit point P3, and a curvature Cu1 of the first curve 51 (first curve curvature).

The curve detector 22A transfers the received information concerning the curve to the target speed calculator 22B, which functions as a first curve target speed calculator.

In step S2, the target speed calculator 22B calculates, at a point P0 where the target speed calculator 22B received the information concerning the curve, a turning target speed Vtc1 for the first curve 51 (also referred to as a "first curve turning target speed"), and also calculates a before-entering-curve target speed characteristic (also referred to as a "before-entering-curve target speed") Vtf1 from the calculated turning target speed Vtc1 and the actual speed V of the host vehicle 11.

The turning target speed Vtc1 and the before-entering-curve target speed characteristic Vtf1 make up a first curve target speed Vt1. The turning target speed Vtc1 is set at a constant speed that enables the host vehicle 11 to turn safely along the first curve 51 having the first curvature Cu1, depending on the first curvature Cu1. The before-entering-curve target speed Vtf1 is set as a speed for calculating a reaction force in a curve entering zone, i.e., a zone from a first curve deceleration start point P1 to the first curve entrance point P2, for the host vehicle 11, so that the host vehicle 11 will travel at the turning target speed Vtc1 at the first curve entrance point P2.

More specifically, the before-entering-curve target speed Vtf1 is set to a speed gradient (linear or curved) in order to gradually reduce the present speed V to the turning target speed Vtc1 over a distance between the first curve entrance point P2 and the first curve deceleration start point P1, which is a prescribed distance prior to the first curve entrance point P2, i.e., a distance from the point P1 to the point P2 shown in FIG. 4B.

According to the present embodiment, the turning target speed Vtc1 is set to a smaller (lower) value in proportion to the curvature (the reciprocal of the radius of curvature). In other words, as the curvature is greater, the turning target speed Vtc1 becomes smaller.

Figure 5:
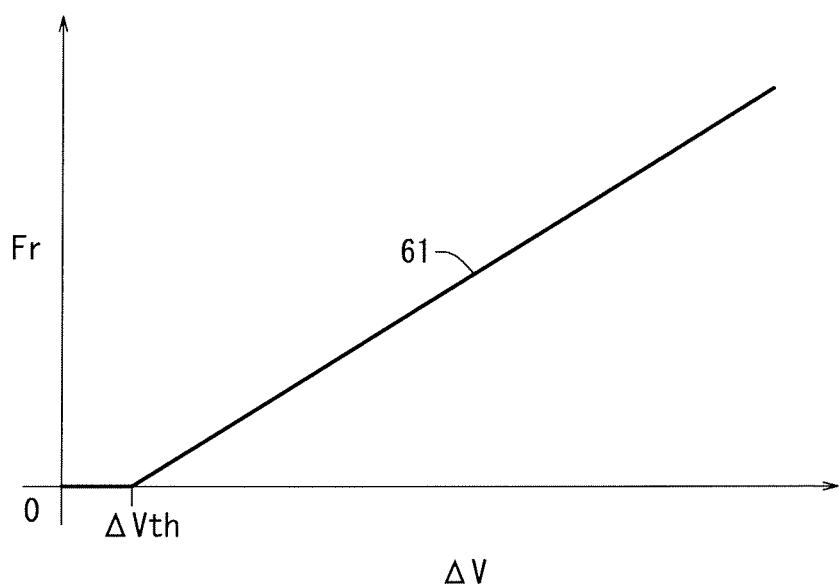
FIG. 5 is a diagram that shows the manner in which a reaction force is applied depending on a speed difference in the presence of a single curve.

In step S3, the reaction force controller 22C determines a reaction force (also referred to as a "first curve target reaction force") Fr to be applied to the accelerator pedal 12 according to a reaction force characteristic 61 (see FIG. 5), which is used to determine a reaction force Fr based on a speed difference $\Delta V$. As shown in FIG. 4B, the speed difference $\Delta V$ represents a difference between the actual speed (present speed) V and the before-entering-curve target speed characteristic Vtf1 ($\Delta V = V - Vtf1$).

In step S4, the reaction force Fr, which is calculated in the foregoing manner, is applied to the accelerator pedal 12 by the reaction force applying mechanism 24. As indicated by the reaction force characteristic 61 shown in FIG. 5, if the speed difference $\Delta V$ is smaller than a threshold value $\Delta Vth$, it is determined that the reaction force Fr does not need to be applied, and hence, the reaction force Fr is not applied to the accelerator pedal 12.

In step S5, it is judged whether or not the host vehicle 11 has reached the first curve entrance point P2. Until the host vehicle 11 reaches the first curve entrance point P2, a reaction force Fr, which was determined in step S3 and output to the accelerator pedal 12 in step S4, and has the characteristic 102 shown in FIG. 4C, is calculated based on the speed difference $\Delta V$ between the actual speed V and the before-entering-curve target speed characteristic Vtf1 shown in FIG. 4B.

If the answer to step S5 is affirmative, i.e., if the host vehicle 11 has reached the first curve entrance point P2, then in step S6, the reaction force Fr applied to the accelerator pedal 12 upon arrival at the first curve entrance point P2 is maintained, i.e., the reaction force Fr continues to be applied to the accelerator pedal 12.

The host vehicle 11, in which the reaction force Fr applied to the accelerator pedal 12 upon arrival at the first curve entrance point P2 is maintained at a constant level, as indicated by the characteristic 104, starts to turn along a first curve turning zone Xc1. In step S7, it is monitored whether or not the host vehicle 11 has finished turning along the first curve turning zone Xc1. In step S8, while the host vehicle 11 turns along the first curve turning zone Xc1, the navigation device 20 detects whether or not there is a second curve 52 within a prescribed distance on the path 50 ahead of the host vehicle 11.

While the host vehicle 11 turns along the first curve 51, since the reaction force Fr applied to the accelerator pedal 12 does not change, the driver of the host vehicle 11 can operate the accelerator pedal 12 without feeling strange and uncomfortable.

According to the distance charts shown in FIGS. 4A, 4B, and 4C, since a second curve 52 does not exist up to a point P5 at the end of the prescribed distance, the answer to step S7 eventually becomes affirmative, i.e., the host vehicle 11 reaches the first curve exit point P3 at the end of the first curve turning zone Xc1. Thereafter, a reaction force fading process is carried out. In the reaction force fading process, as indicated by a reaction force characteristic 106, the reaction force Fr is gradually reduced to zero over a prescribed time or distance from the first curve exit point P3 shown in FIG. 4C.

[Second Process: Reaction Force Control Process in the Presence of a Second Curve within a Prescribed Distance after Exiting from a First Curve]

A process of setting a reaction force applied to the accelerator pedal 12, which is carried out by the ECU 22, will be described in detail below with reference to the flowchart shown in FIG. 3 and the distance charts shown in FIGS. 6A, 6B, and 6C.

Figure 2:
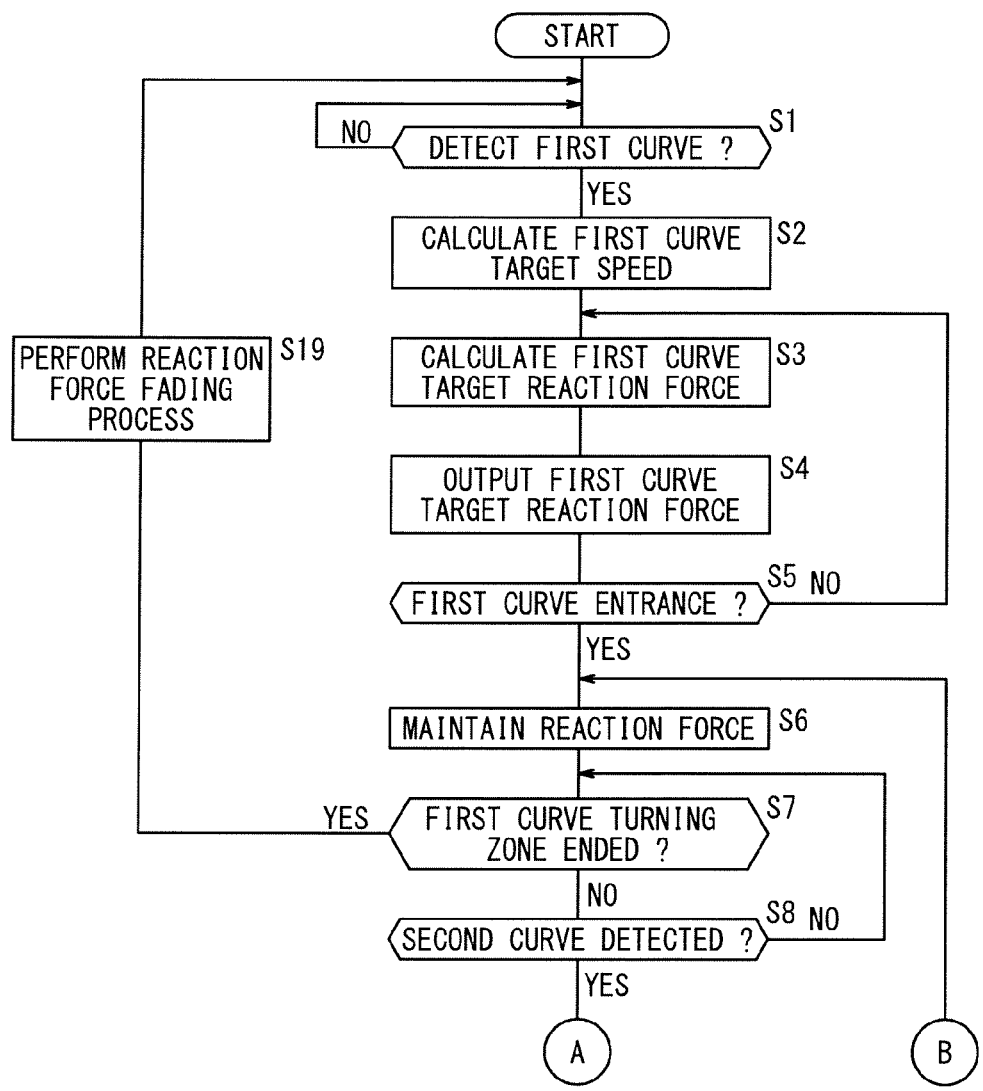
FIG. 2 is a flowchart (1 of 2) of an operation sequence of the reaction force control apparatus shown in FIG. 1.

The process includes steps S1 through S8, which are identical to those of the first process shown in FIG. 2. Steps S1 through S8 will be described briefly below.

Figures 6A, 6B, 6C:
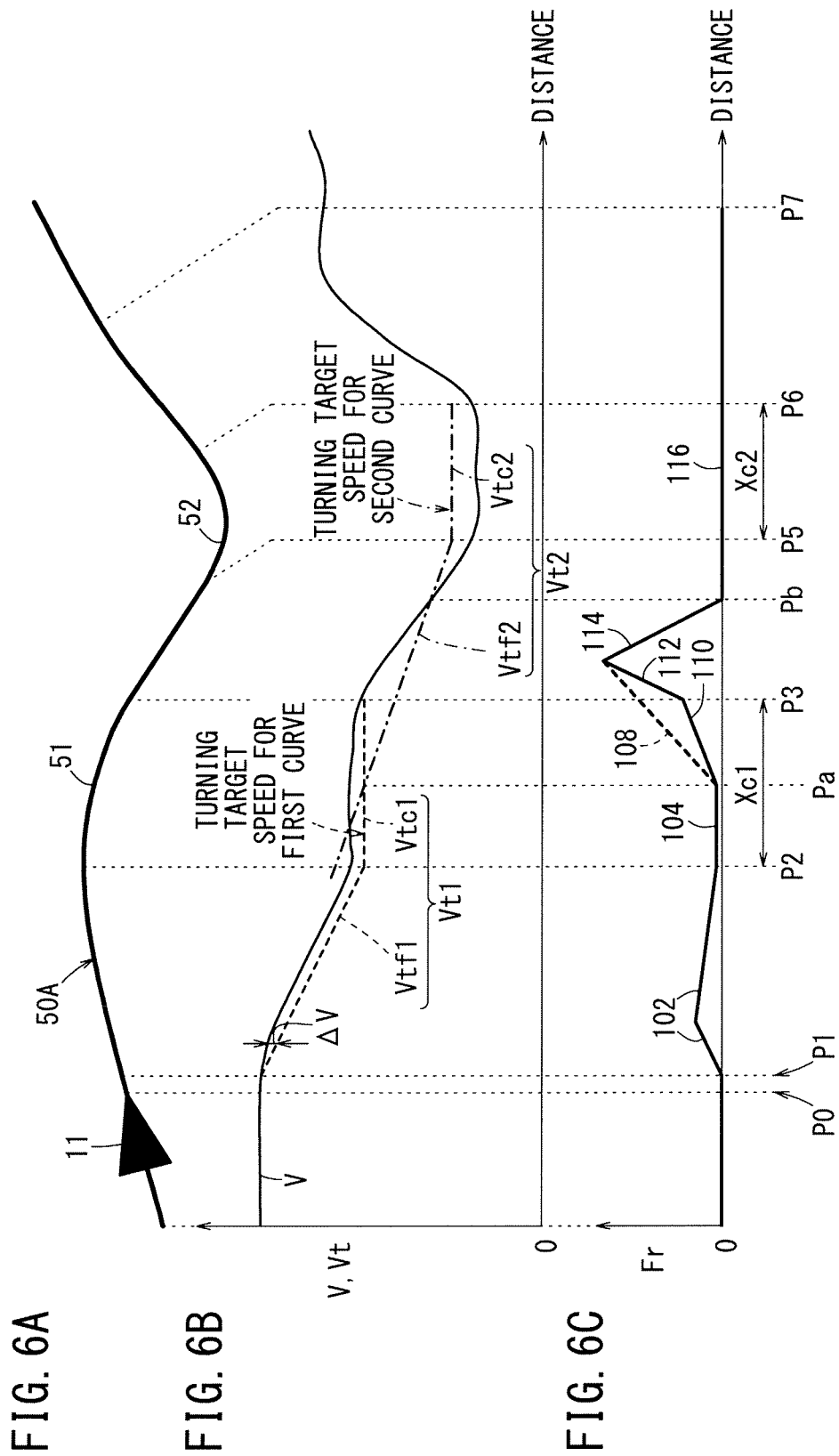
FIG. 6A is a diagram of a path, which illustrates a reaction force control process that is performed when a first curve is followed by a second curve within a prescribed distance after exiting from the first curve.
FIG. 6B is a diagram that illustrates setting of a target speed with respect to distances in the presence of the second curve, which follows within the prescribed distance.
FIG. 6C is a diagram that illustrates setting of reaction forces with respect to distances in the presence of the second curve, which follows within the prescribed distance.

As shown in FIG. 6A, the host vehicle 11 travels along a path 50A. While the host vehicle 11 travels along the path 50A, in step S1, the navigation device 20 detects whether or not there is a first curve 51 within a prescribed distance on the path 50A ahead of the host vehicle 11. If the navigation device 20 detects the first curve 51, the navigation device 20 sends information concerning the curve, including the distance from the host vehicle 11 to a first curve entrance point P2, the position of the first curve entrance point P2, the position of a first curve exit point P3, and the curvature Cu1 of the first curve 51 (first curve curvature), to the curve detector 22A.

The curve detector 22A then transfers the received information concerning the curve to the target speed calculator 22B, which functions as a first curve target speed calculator.

In step S2, the target speed calculator 22B calculates, at a point P0 where the target speed calculator 22B received the information concerning the curve, a turning target speed Vtc1 for the first curve 51. The target speed calculator 22B also calculates a before-entering-curve target speed characteristic (also referred to as a "before-entering-curve target speed") Vtf1 from the calculated turning target speed Vtc1 and the actual speed V. The turning target speed Vtc1 and the before-entering-curve target speed characteristic Vtf1 make up a first curve target speed Vt1. The turning target speed Vtc1 is set to a constant speed at which the host vehicle 11 is capable of turning safely along the first curve 51 having the first curvature Cu1, depending on the first curvature Cu1. The before-entering-curve target speed Vtf1 is set as a speed for calculating a reaction force in a curve entering zone for the host vehicle 11, i.e., a zone from a first curve deceleration start point P1 to the first curve entrance point P2, so that the host vehicle 11 will travel at the turning target speed Vtc1 at the first curve entrance point P2.

In step S3, the reaction force controller 22C determines a reaction force Fr to be applied to the accelerator pedal 12 according to a reaction force characteristic 61 (see FIG. 7, which is the same as the reaction force characteristic 61 shown in FIG. 5), which is used to determine a reaction force Fr based on a speed difference $\Delta V$. As shown in FIG. 6B, the speed difference $\Delta V$ represents the difference between the actual speed (present speed) V and the before-entering-curve target speed characteristic Vtf1 ($\Delta V=V-Vtf1$).

In step S4, the reaction force Fr, which was calculated in the foregoing manner, is applied to the accelerator pedal 12 by the reaction force applying mechanism 24.

In step S5, it is judged whether or not the host vehicle 11 has reached the first curve entrance point P2. Until the host vehicle 11 reaches the first curve entrance point P2, a reaction force Fr, which was determined in step S3 and output to the accelerator pedal 12 in step S4, and has the characteristic 102 shown in FIG. 6C, is calculated based on the speed difference $\Delta V$ between the actual speed V and the before-entering-curve target speed characteristic Vtf1 shown in FIG. 6B.

If the answer to step S5 is affirmative, i.e., if the host vehicle 11 has reached the first curve entrance point P2, then in step S6, the reaction force Fr according to the characteristic 104 upon arrival at the first curve entrance point P2 is maintained, i.e., the reaction force Fr continues to be applied to the accelerator pedal 12.

The host vehicle 11, in which the reaction force Fr continues to be applied to the accelerator pedal 12, starts to turn along a first curve turning zone Xc1. In step S7, it is monitored whether or not the host vehicle 11 has finished turning along the first curve turning zone Xc1. In step S8, while the host vehicle 11 turns along the first curve turning zone Xc1, the navigation device 20 detects whether or not there is a second curve 52 within a prescribed distance on the path 50 ahead of the host vehicle 11.

Figure 3:
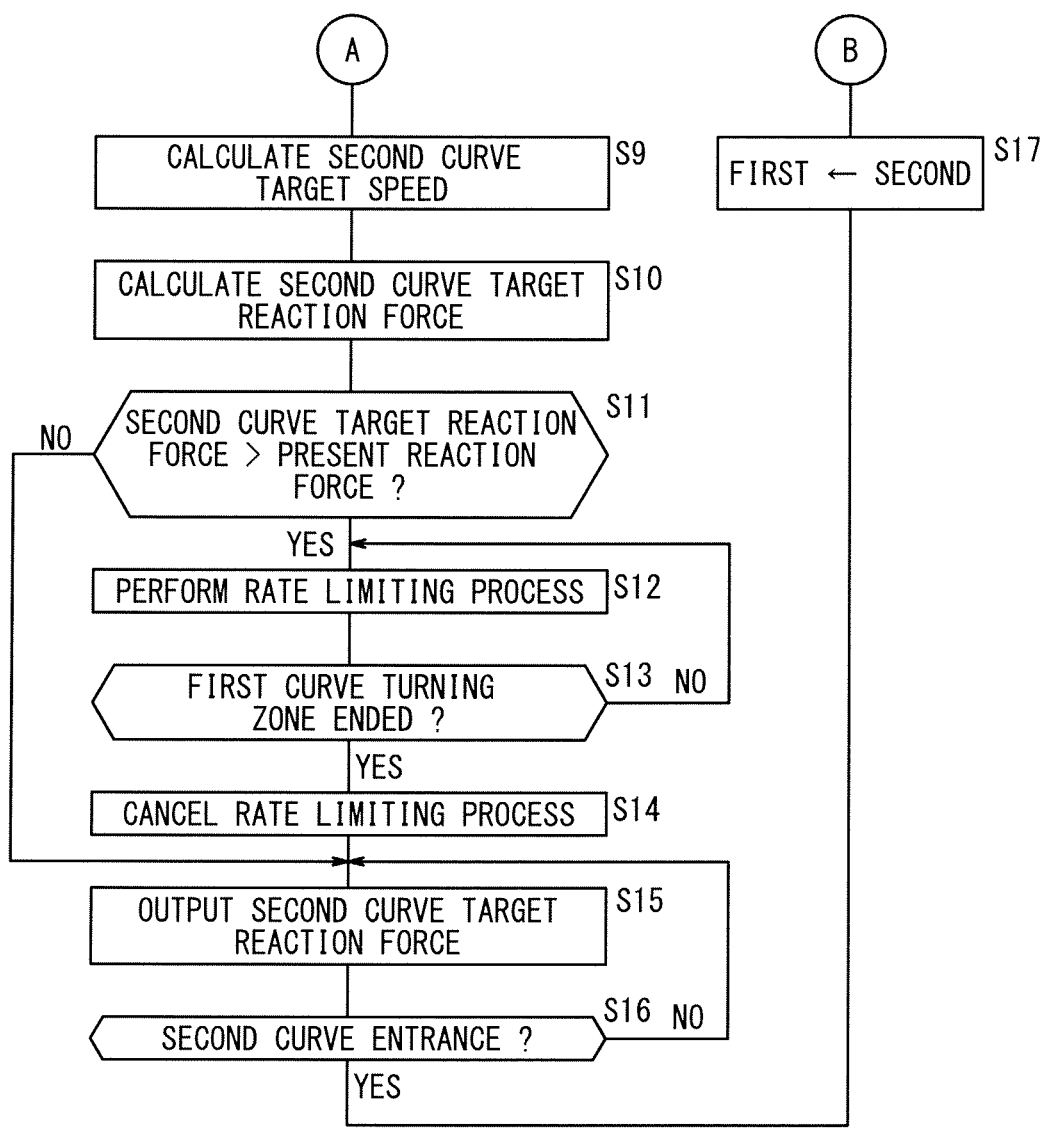
FIG. 3 is a flowchart (2 of 2) of an operation sequence of the reaction force control apparatus shown in FIG. 1.

According to the distance charts shown in FIGS. 6A, 6B, and 6C, since a second curve 52 exists, the answer to step S8 is affirmative, and control proceeds to step S9 in FIG. 3.

In step S9, similar to step S2, the target speed calculator 22B calculates, at a point where the target speed calculator 22B has received information concerning the curve, i.e., at a point between the point P2 and the point P3, a turning target speed Vtc2 for the second curve 52. The target speed calculator 22B also calculates a before-entering-curve target speed characteristic (also referred to as a "before-entering-curve target speed") Vtf2 from the calculated turning target speed Vtc2 and the actual speed V of the host vehicle 11.

The turning target speed Vtc2 is set to a constant speed at which the host vehicle 11 is capable of turning safely along the second curve 52 having a second curvature Cu2, depending on the second curvature Cu2. In addition, the before-entering-curve target speed Vtf2 is set as a speed for calculating a reaction force for the host vehicle 11 in a curve entering zone, i.e., a zone from a point Pa, which is a prescribed distance ahead of the entrance to the second curve 52 and at which the navigation device 20 has detected the second curve 52, to a second curve entrance point P5, so that the host vehicle 11 will travel at the turning target speed Vtc2 at the second curve entrance point P5.

More specifically, the before-entering-curve target speed Vtf2 is set to a speed gradient (linear or curved) in order to gradually reduce the present speed V to the turning target speed Vtc2 over a distance between the point Pa, which is a prescribed distance ahead of the entrance of the second curve 52 and at which the navigation device 20 has detected the second curve 52 while the host vehicle 11 is traveling along the first curve 51, and the second curve deceleration start point P2, i.e., the distance from the point Pa to the point P5 shown in FIG. 6B.

In step S10, the reaction force controller 22C determines a reaction force (also referred to as a "second curve target reaction force") Fr to be applied to the accelerator pedal 12, which has a reaction force characteristic between a reaction force characteristic 62a and a reaction force characteristic 62b, and which is smaller than the reaction force Fr according to the reaction force characteristic 61. The reaction force Fr is determined using the reaction force characteristic 62a (in which the distance between the first and second curves is small) and the reaction force characteristic 62b (in which the distance between the first and second curves is large) shown in FIG. 7, which are used to determine the reaction force Fr based on a speed difference $\Delta V$.

More specifically, the reaction force characteristic 62a is applied in the case that the distance between the first curve 51 and the second curve 52 (inter-curve distance) is small, whereas the reaction force characteristic 62b is applied in the case that the distance between the first curve 51 and the second curve 52 is large. Depending on the distance between the first curve 51 and the second curve 52, a characteristic having a gradient, which lies between the gradients of the reaction force characteristics 62a and 62b, is interpolated.

In step S11, it is judged whether or not the second curve target reaction force Fr is greater than the presently applied reaction force Fr. If the second curve target reaction force Fr is smaller than the presently applied reaction force Fr, the second curve target reaction force Fr, i.e., the reaction force having the characteristic 104, is output in step S15. Then it is judged whether or not the host vehicle 11 has reached the second curve entrance point.

Figure 7:
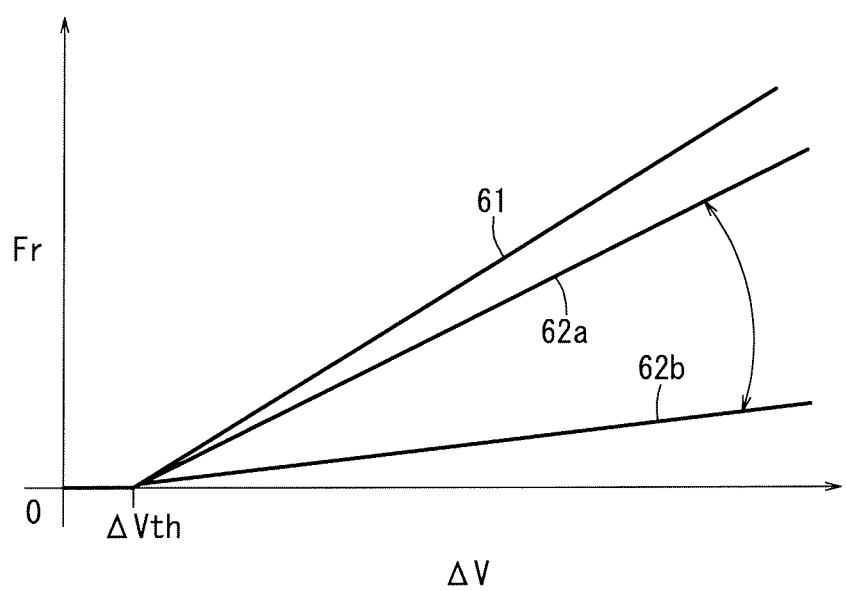
FIG. 7 is a diagram showing the manner in which reaction forces are applied depending on a speed difference in the presence of a succession of curves.

In contrast thereto, in step S11, if the second curve target reaction force Fr, i.e., the reaction forced Fr having a characteristic 108, is greater than the presently applied reaction force Fr, i.e., the reaction force having the characteristic 104 (see point Pa in FIG. 6C), then since the host vehicle 11 is traveling along the first curve 51, the reaction forced Fr having the characteristic 108, which corresponds to the second curve target reaction force Fr, is not simply applied as is, but rather, the second curve target reaction force Fr is reduced depending on the speed difference $\Delta V$ by a rate limiting process by referring to a reaction force characteristic between the reaction force characteristics 62a and 62b shown in FIG. 7, as indicated by a reaction force Rr having a characteristic 110. In addition, the reduced reaction force is applied to the accelerator pedal 12, so that the driver will not feel strange and uncomfortable on account of the applied reaction force Fr.

While the rate limiting process (between points Pa and P3) is performed, in step S13, it is judged whether or not the host vehicle 11 has finished turning along the first curve turning zone Xc1. In step S14, at point P3, after the host vehicle 11 has finished turning along the first curve turning zone Xc1, the rate limiting process is canceled. In step S15, a second curve target reaction force Fr is output having a characteristic 112 (FIG. 6C) calculated depending on the speed difference $\Delta V$ by referring to the reaction force characteristic 61 (FIG. 7). Then, in step S16, it is judged whether or not the host vehicle 11 has reached the second curve entrance point P5. If the host vehicle 11 has reached the second curve entrance point P5, then control proceeds to step S17 in which "first" is replaced with "second". Thereafter, control returns to step S6 and the reaction force is maintained (point P5).

According to the distance charts shown in FIGS. 6A, 6B, and 6C, since the speed difference $\Delta V=V-Vtf2$ is zero at a point Pb prior to the second curve entrance point P5 and the speed difference $\Delta V$ is negative ($\Delta V<0$) at the second curve entrance point P5, the reaction force Fr is zero (Fr=0) and the reaction force Fr=0 is maintained at the second curve entrance point P5.

Therefore, the reaction force Fr is maintained at zero within the second curve turning zone Xc2 from the second curve entrance point P5 to the second curve exit point P6.

While the host vehicle 11 is in the second curve turning zone Xc2 from the second curve entrance point P5 to the second curve exit point P6, since the actual speed V is smaller than the turning target speed Vtc2 for the second curve 52, as shown in FIG. 6B, the host vehicle 11 can turn safely along the second curve turning zone Xc2.

If the distance between the exit point P3 of the first curve 51 and the entrance point P5 of the second curve 52 is short, as shown in FIGS. 8A, 8B, and 8C, a reaction force Fr having a characteristic 118 is not as small as the reaction force Fr having the characteristic 110 (FIG. 6C). In other words, as the distance between the first curve 51 and the second curve 52 subsequent to the first curve 51 becomes shorter, the degree to which the reaction force Fr is reduced by the rate limiting process is not decreased significantly. In FIGS. 8A, 8B, and 8C, from the exit point P3 of the first curve 51 (=the entrance point P5 of the second curve 52), a reaction force Fr is calculated by referring to the reaction force characteristic 61 shown in FIG. 7, depending on the difference $\Delta V$ between the turning target speed Vtc2 of the second curve 52 and the actual speed V. The calculated reaction force Fr is applied to the accelerator pedal 12 by the reaction force applying mechanism 24.

Furthermore, as shown in FIGS. 8A, 8B, and 8C, since no curve is detected along a path 50B from the point P6, through the point P8, to the point P9, the reaction force Fr remains zero, as indicated by a characteristic 124. The reaction force Fr also remains zero from a point Pc at which the actual speed V is lower than the turning target speed Vtc2 of the second curve 52, i.e., a point where the characteristic 122 changes to the characteristic 124, to the point P6.

[Review of the Present Embodiment]

As described above, the reaction force control apparatus 10 according to the present embodiment includes the accelerator pedal 12 for adjusting the opening of the throttle valve, not shown, (or for adjusting an amount of current for energizing a motor if the vehicle is an electric vehicle driven by the motor), the reaction force controller 22C for controlling a reaction force Fr applied to the accelerator pedal 12, which is generated by the reaction force applying mechanism 24 that serves as an actuator, and the curve detector 22A for detecting the curves 51 and 52 along the paths 50, 50A, and 50B on which the host vehicle 11 travels.

Before the host vehicle 11 enters the curves 51 and 52, the reaction force controller 22C sets a target reaction force Fr to be applied to the accelerator pedal 12 depending on the curvatures Cu1, Cu2 of the curves 51 and 52. For generating the set target reaction force Fr before the host vehicle 11 enters the curves 51 and 52, and by applying the generated target reaction force Fr, when the host vehicle 11 is traveling and is about to travel along at least the two curves 51 and 52, i.e., the first curve 51 and the second curve 52 subsequent to the first curve 51, if the target reaction force Fr (the reaction force according to the characteristic 108 shown in FIG. 6C), which is set before the host vehicle 11 enters the second curve 52, is greater than the present reaction force Fr (the reaction force according to the characteristic 104 shown in FIG. 6C) generated and applied to the accelerator pedal 12 while the host vehicle 11 travels and turns along the first curve 51, the target reaction force Fr for the second curve 52 is reduced, and the reaction force according to the characteristic 110 shown in FIG. 6C is applied to the accelerator pedal 12 until the host vehicle 11 has finished traveling through the first curve 51. The reaction force Fr also remains zero from a point Pb at which the actual speed V is lower than the turning target speed Vtc2 of the second curve 52, i.e., a point where the characteristic 114 changes to the characteristic 116.

According to the present embodiment, when the host vehicle 11 travels along successive curves 51 and 52, the driver feels less strange and uncomfortable concerning operation of the accelerator pedal 12, and reaction force characteristics for the accelerator pedal 12 are established depending on the nature of the curves 51 and 52.

When the host vehicle 11 travels along successive curves 51 and 52, the target reaction force Fr for the second curve 52 may be corrected (calculated) based on the target reaction force Fr for the first curve 51. Conversely, the target reaction force Fr for the first curve 51 may be corrected (calculated) based on the target reaction force Fr for the second curve 52. In other words, the target reaction force Fr for one of the curves may be corrected based on the target reaction force Fr for the other curve.

In such a case, as shown in FIGS. 8A, 8B, and 8C, the reaction force controller 22C may lessen the amount by which the target reaction force Fr for the second curve 52, i.e., the difference between the reaction forces according to characteristics 108 and 118, is reduced, as the distance between the exit point P3 of the first curve 51 and the entrance point P5 of the second curve 52, which are detected by the curve detector 22A, becomes shorter.

If the distance between the first curve 51 and the second curve 52 is shorter, the driver is required to decelerate the host vehicle 11 more quickly than if the distance between the first curve 51 and the second curve 52 were greater. Since the reduction in the target reaction force Fr for the second curve 52 becomes smaller as the distance is shorter, the driver is prompted to decelerate the host vehicle 11 in preparation for the second curve 52, or the driver is made aware of the presence of the second curve 52, without being made to feel strange and uncomfortable while traveling along the first curve 51. Consequently, the driver is able to maneuver the host vehicle 11 more easily while the host vehicle 11 travels along a succession of curves, which are separated by short distances therebetween.

If the curve detector 22A detects that the curvature Cu2 of the second curve 52 subsequent to the first curve 51 is smaller than the curvature Cu1 of the first curve 51 (Cu2<Cu1), i.e., the radius of curvature of the second curve 52 is greater than the radius of curvature of the first curve 51, or that the curvature Cu2 of the second curve 52 is smaller than a prescribed curvature (curvature threshold value) Cuth, i.e., the radius of curvature of the second curve 52 is greater than a prescribed radius of curvature, (Cu2<Cuth), then the reaction force controller 22C may reduce the amount by which the target reaction force Fr is reduced for the second curve 52, or may not reduce the target reaction force Fr for the second curve 52.

More specifically, if the curvature Cu2 of the second curve 52 is small, i.e., if the radius of curvature of the second curve 52 is large, then since the driver feels less strange and uncomfortable concerning operation of the accelerator pedal 12 due to the generated reaction force, the driver can prepare for traveling along the second curve 52, which has a small curvature Cu2 or a large radius of curvature, even if the amount by which the target reaction force Fr for the second curve 52 is reduced is smaller, or even if the target reaction force Fr for the second curve 52 is not reduced.

The above embodiment may include an arrangement, which includes a reaction force control method (reaction force control apparatus) as described below.

A reaction force control method (reaction force control apparatus) sets turning target speeds Vtc1, Vtc2 for the curves 51 and 52 depending on respective curvatures Cu1, Cu2 of the curves 51 and 52 before the host vehicle 11 enters the curves 51 and 52. The reaction force control method (reaction force control apparatus) applies a reaction force Fr, which depends on a speed difference (error) ΔV between the set turning target speed Vtc1 and an actual speed (present speed) V, so as to prompt the driver of the host vehicle 11 to decelerate the host vehicle 11 to the turning target speeds Vtc1, Vtc2 until the host vehicle 11 arrives at the entrance points P2, P5 of the curves 51 and 52. The reaction force control method (reaction force control apparatus) comprises a step (step S11, comparing means, comparing section) of comparing the turning target speed Vtc2 for the second curve 52 and the turning target speed Vtc1 for the first curve 51 with each other when the turning target speed Vtc2 is set for the second curve 52, which is subsequent to the first curve 51 within a prescribed distance. In addition, if the turning target speed Vtc2 for the second curve 52 is smaller than the turning target speed Vtc1 for the first curve 51, the reaction force control method (reaction force control apparatus) also comprises a step (step S19, reduced reaction force applying means, reduced reaction force applying section) of applying a reaction force Fr (characteristic 118) representing a reduced value of the reaction force Fr (characteristic 108) depending on the speed difference ΔV between the actual speed V and the turning target speed Vtc2 for the second curve 52.

With the above arrangement, when the host vehicle 11 travels along the successive curves 51 and 52, the driver feels less strange and uncomfortable concerning operation of the accelerator pedal 12, and reaction force characteristics for the accelerator pedal 12 are established depending on the nature of the curves 51 and 52.

The present invention is not limited to the above embodiment, and various arrangements may be adopted based on the disclosure of the present description.

For example, the present invention may be utilized as a reaction force control apparatus 10 having a reaction force controller 22C for controlling a reaction force Fr, the reaction force Fr being applied to the accelerator pedal 12. The reaction force Fr is generated by the reaction force applying mechanism 24, which serves as an actuator, and a curve detector 22A for detecting a curve on a path 50 traveled by a host vehicle 11. In this case, as shown in FIG. 5A, if the curve detector 22A detects only one curve 51, the reaction force controller 22C sets a target reaction force Fr depending on the detected one curve 51. Then, when the host vehicle 11 reaches a first curve exit point (end point) P3 of the one curve 51, the reaction force controller 22C gradually reduces the reaction force Fr to zero according to a reaction force characteristic 106. With such a reaction force control apparatus 10, the driver is less likely to feel strange and uncomfortable concerning operation of the accelerator pedal 12 when the host vehicle 11 is traveling along the curve 51, and also immediately after the host vehicle 11 has traveled along the curve 51.

The invention claimed is:

1. A reaction force control apparatus comprising:
an accelerator pedal of a host vehicle;
a reaction force controller for controlling a reaction force generated by an actuator the reaction force being applied to the accelerator pedal and
a curve detector for detecting curves along a path traveled by the host vehicle;
wherein when the host vehicle travels along at least two curves including a first curve and a second curve subsequent to the first curve, the reaction force controller is configured to set respective target reaction forces for the first curve and the second curve;
wherein the reaction force controller is configured to correct the target reaction force for the second curve based on the target reaction force for the first curve; and
wherein the reaction force controller is configured to set the target reaction force for the accelerator pedal depending on a curvature of each of the curves before the host vehicle enters the curves and to generate and apply the set target reaction force to the accelerator pedal before the host vehicle enters the curves, wherein when a target reaction force for the second curve, which is set before the host vehicle enters the second curve, is greater than a present reaction force generated and applied to the accelerator pedal while the host vehicle is turning along the first curve, the reaction force controller is configured to correct the target reaction force for the second curve by reducing the target reaction force for the second curve and to apply the reduced reaction force to the accelerator pedal until the host vehicle has finished traveling through the first curve.

2. The reaction force control apparatus according to claim 1, wherein the reaction force controller is configured to make an amount of a reduction in the target reaction force for the second curve smaller as the distance between an exit of the first curve and an entrance of the second curve which are detected by the curve detector becomes shorter.

3. The reaction force control apparatus according to claim 1, wherein the reaction force controller is configured to reduce an amount by which the target reaction force is reduced for the second curve when the curvature of the second curve detected by the curve detector is smaller than the curvature of the first curve.

4. The reaction force control apparatus according to claim 1, wherein the reaction force controller is not configured to reduce the target reaction force for the second curve when the curvature of the second curve detected by the curve detector is smaller than the curvature of the first curve.

5. The reaction force control apparatus according to claim 1, wherein the reaction force controller is configured to reduce an amount by which the target reaction force is reduced for the second curve when the second curve detected by the curve detector is smaller than a prescribed curvature.

6. The reaction force control apparatus according to claim 1, wherein the reaction force controller is not configured to reduce the target reaction force for the second curve when the curvature of the second curve detected by the curve detector is smaller than a prescribed curvature.

7. The reaction force control apparatus according to claim 1, further comprising:
a vehicle speed sensor for measuring a vehicle speed of the host vehicle; and
a target speed calculator for calculating a speed at which the host vehicle travels or turns along each of the curves as a turning target speed depending on a curvature of each of the curves that are detected;

wherein the target speed calculator is configured to calculate a reduction characteristic for reducing the target speed from a present vehicle speed measured by the vehicle speed sensor to the turning target speed; and wherein the reaction force controller is configured to set the target reaction force based on the present vehicle speed measured by the vehicle speed sensor, the turning target speed calculated by the target speed calculator and the reduction characteristic for reducing the target speed calculated by the target speed calculator.

8. The reaction force control apparatus according to claim 1, wherein when the curve detector detects only one curve, the reaction force controller is configured to set a target reaction force depending on the detected one curve, and to gradually reduce the reaction force when the host vehicle reaches an end point of the detected one curve.

9. The reaction force control apparatus according to claim 1, wherein when the curve detector detects the second curve while the host vehicle is traveling or turning along the first curve, the reaction force controller is configured to calculate a second curve target reaction force based on the second curve, and when the calculated second curve target reaction force is greater than a reaction force presently applied to the accelerator pedal while the host vehicle is traveling along the first curve, the reaction force controller is configured to perform a rate limiting process on the reaction force characteristic, depending on a difference between a present vehicle speed measured by the vehicle speed sensor and a target speed set for the second curve.

* * * * *